W. C. H. BELLMAN.
HEAD GEAR FOR ANIMALS.
APPLICATION FILED JAN. 2, 1917.
1,288,806.
Patented Dec. 24, 1918.
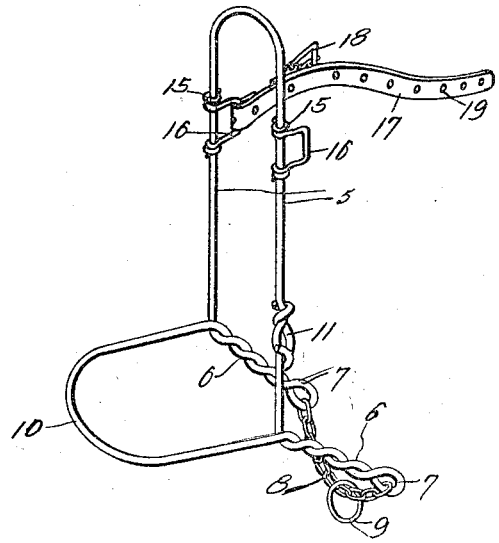
Witness
O. M. Hunt
Inventor
W. C. H. Bellman.
By Talbert & Parker
Attorney

UNITED STATES PATENT OFFICE.

WILLIAM C. H. BELLMAN, OF BIRD CITY, KANSAS.

HEAD-GEAR FOR ANIMALS.

1,288,806.     Specification of Letters Patent.     Patented Dec. 24, 1918.

Application filed January 2, 1917. Serial No. 140,196.

*To all whom it may concern:*

Be it known that I, WILLIAM C. H. BELLMAN, a citizen of the United States, residing at Bird City, in the county of Cheyenne and State of Kansas, have invented certain useful Improvements in Head-Gear for Animals, of which the following is a specification, reference being had therein to the accompanying drawing.

This invention comprehends generally improvements in head-gear for animals and more particularly relates to an improved halter.

It is the primary aim and object of the present invention to provide a halter designed to be attached to the head of an animal in such manner as to enable the attendant to easily control and lead the animal.

A further object of this invention is the provision of a device of this character which will not interfere with the animal's grazing, and which is simple, durable and inexpensive in construction and thoroughly efficient and practical in use.

In the accompanying drawing there is illustrated a perspective view of the device.

Referring to the drawing in detail, the numeral 5 designates one inverted substantially U-shaped member which has its side stretches twisted on themselves to form the extensions 6 providing eye terminals 7 with which are engaged the terminal links of a chain 8 carrying the loose ring 9, while substantially at right angles to the member 5 is a substantially U-shaped member 10. The member 5, the extensions 6 and the member 10 are all formed from a single strand of material, preferably wire, and the ends of this strand are twisted together or notched at 11 for connecting the same.

Again with reference to the drawing, the side stretches of the member 5 have twisted thereon the terminal portions 15 of loops 16, to one of which is connected one end of a strap 17 which carries a buckle 18, the strap being provided with suitable openings 19 for detachable and adjustable engagement in the buckle 18, and this strap is adapted to engage about the throat of the animal when the halter is placed thereon so that the halter cannot be worked off of the head of the animal. The strap 17 at its perforated end portion is engaged with the other loop 16 when the halter is placed upon the head of the animal.

Having thus described my invention, I claim:

A halter of the character described including a body formed from a single piece of wire and consisting of a vertically arranged U-shaped member, one of the side portions being extended downwardly and folded upon itself and twisted to provide a shank having an eye terminal, another U-shaped member projecting from the inner end of the twisted shank and positioned forwardly of the first U-shaped member and at an angle thereto, the side portion of the last mentioned U-shaped member opposite the first shank being extended downwardly and folded upon itself and twisted to provide another shank having an eye terminal, the shanks being arranged in an opposed relation with respect to each other, a chain, the end links of which are connected in the eye terminals of the shank, a ring loosely engaged on the chain, loops connected to the sides of the first U-shaped member, and a strap adjustably engaged in the loops.

In testimony whereof I affix my signature.

WILLIAM C. H. BELLMAN.